May 22, 1951  A. A. DAVIS  2,554,091
HAND TRUCK
Filed March 29, 1948  2 Sheets-Sheet 1
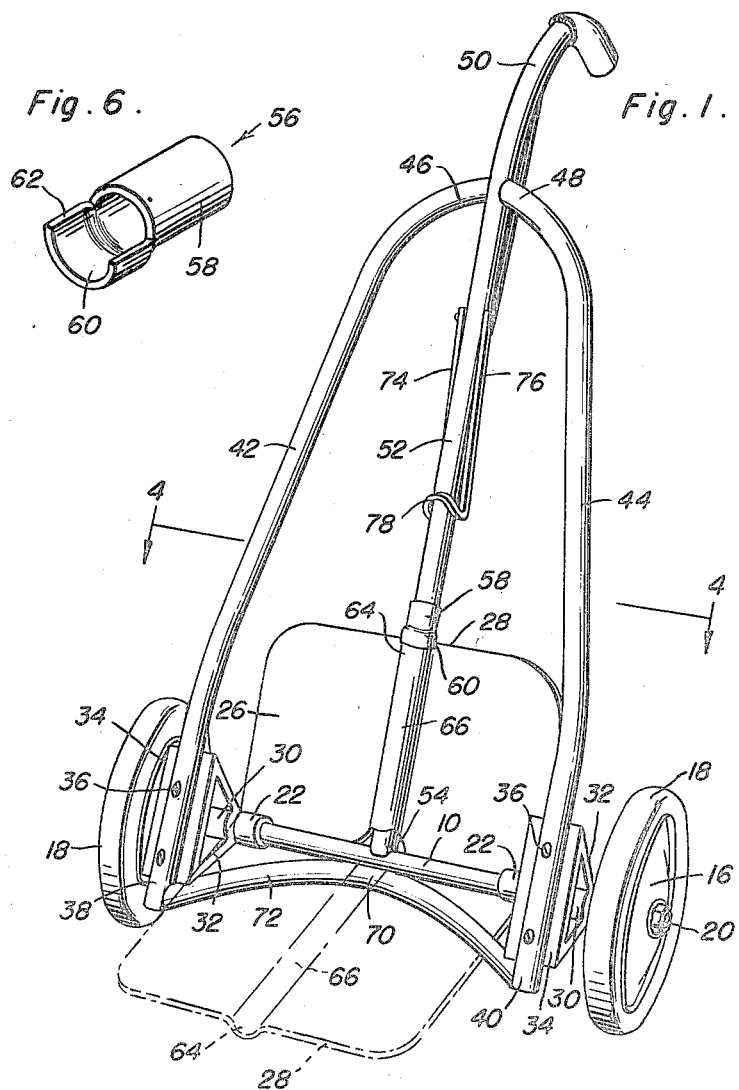
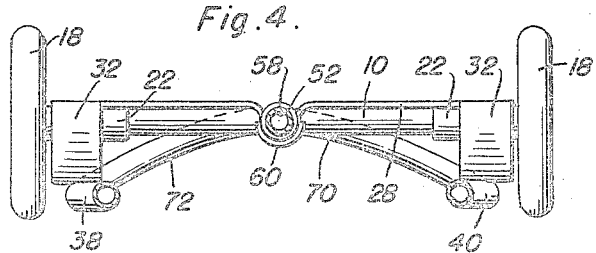
Albert A. Davis
INVENTOR.
BY

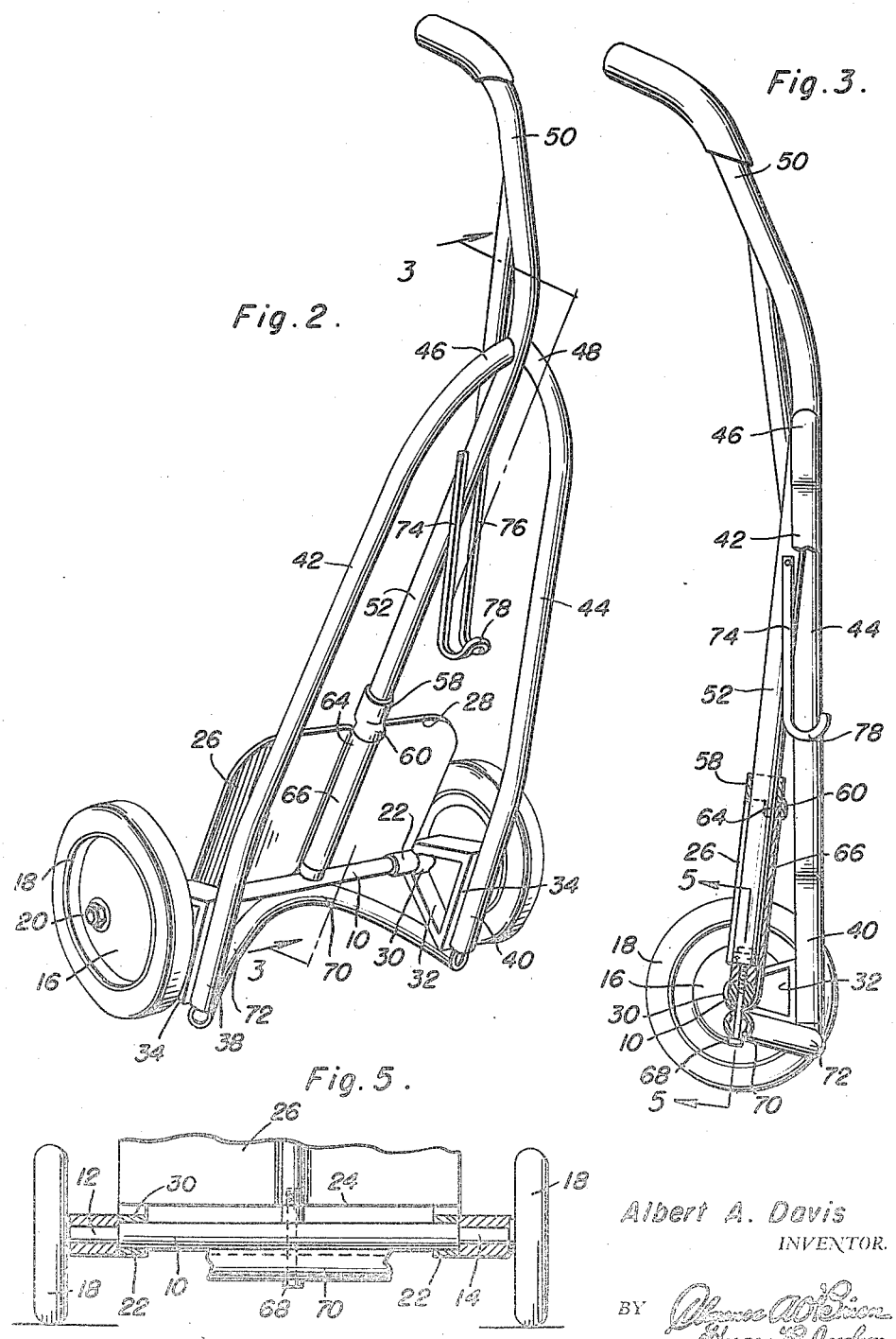

Patented May 22, 1951

2,554,091

UNITED STATES PATENT OFFICE 2,554,091

HAND TRUCK

Albert A. Davis, Alliance, Ohio

Application March 29, 1948, Serial No. 17,640

1 Claim. (Cl. 280—57)

This invention relates to new and useful improvements in carts, and the primary object of the present invention is to provide a cart including a hinged article supporting platform and novel and improved means for holding the platform in a raised or inoperative position.

Another important object of the present invention is to provide a wheeled cart including a handle and novel and improved means carried by the handle for engaging the handle loop of a milk container to apply the container in position on the present cart in a convenient manner for transportation as the handle is pulled or pushed in one direction.

A further object of the present invention is to provide a wheeled cart so designed as to facilitate a bag of articles, cylindrical containers and the like to be nestled or cradled thereon without movement during the wheeling of the cart to a desired location.

A still further aim of the present invention is to provide a wheeled cart that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a front perspective view of the present cart showing the article supporting platform in a raised inactive position, and with dotted lines showing the article supporting platform in a lowered position for use;

Figure 2 is a perspective view of the present wheeled cart, the platform held in a raised position, and showing the cart tilted slightly to facilitate the hooked element carried thereby to engage the handle loop of a milk container (not shown);

Figure 3 is a longitudinal sectional view taken substantially on the plane of broken section line 3—3 of Figure 2;

Figure 4 is a transverse sectional view taken substantially on the plane of section line 4—4 of Figure 1;

Figure 5 is a transverse vertical sectional view taken substantially on the plane of section line 5—5 of Figure 3; and, Figure 6 is a perspective view of the locking member used in conjunction with the present invention.

Referring now to the drawings in detail, wherein for the purpose of illustration, there is disclosed a preferred embodiment of the present invention, the numeral 10 represents a preferably cylindrical axle having reduced terminals 12 and 14 that rotatably engage a pair of suitable wheels 16 having preferably rubberized tire portions 18. The outer extremities of the terminals 12 and 14 are threaded and receivably engage nuts 20 that prevent outward movement of the wheels 16 on the axle 10.

Rotatably mounted on the axle 10, is a pair of longitudinally spaced sleeves 22 that are fixed to or integrally formed with the inner edge 24 of a substantially rectangular supporting platform 26 having a free outer longitudinal edge 28. Also rotatable on the axle 10, intermediate the sleeves 22 and wheels 16, is a further pair of sleeves 30 that are integrally formed at the apices of a pair of substantially triangular support members 32 having base portions 34.

Removably secured by fasteners or the like 36 to the base portions 34 of the support members 32, are the inner spaced ends 38 and 40 of a pair of arcuate, preferably tubular brace members 42 and 44, the upper ends 46 and 48 of which converge and are fixed adjacent the upper arcuate end 50 of a preferably cylindrical handle 52 having its lower end 54 fixed to the central portion of the axle 10. Slidably mounted on the handle 52, is a locking member 56 including a cylindrical element 58 having an enlarged end portion 60 that is formed with a notch 62. The enlarged end portion 60 of the cylindrical element 58 frictionally embraces the upper end 64 of the channeled transverse central portion 66 of the platform 26 to hold the latter in a raised position as shown best in Figure 3 of the drawings. To lower the platform 26, the sleeve 58 is raised upwardly on the handle 52 so that the enlarged lower portion 60 of said sleeve 58 will disengage the other portion 64 of the platform 26 and the platform may swing downwardly.

Removably secured to the central portion of the axle 10 and the lower end of the handle 52 by a bolt or the like 68, is the center portion 70 of an arcuate, substantially U-shaped bearing member 72, the free ends of which engage and are preferably removably secured to the lower extremities of the brace members 42 and 44 by an suitable means. the member 72 will support the platform when the latter is lowered to its operative position.

Pivotally mounted on the handle 52 are the inner ends of a pair of arms 74 and 76 the free ends of which are integrally formed with a loop or hook element 78 that normally embraces the handle 52, as shown best in Figure 1 of the drawings.

In practical use of the present invention, for loading articles thereon such as bags of potatoes, cylindrical elements or other similar articles, the handle 52 is tilted rearwardly so that the bearing member 70 frictionally engages a supporting surface to hold the said handle in an inclined position as shown best in Figure 2 of the drawings. The locking member 56 is then raised on the handle 52 so that the platform 26 will be pivoted downwardly to frictionally engage the bearing member or element 72. The container will be pulled upon the platform and may be nestled or cradled between the brace members 42 and 44 and upon the handle 52.

Obviously, the present cart may be used without the necessity of having to lower the platform 26 in which case, a bag of articles or an element that is to be transported may be conveniently placed between the base members 42 and 44 to bear upon the handle 52. It is noted, that the hook element 78 is so positioned relative to the handle 52 that the same will engage a suitable element, such as the handle loop of a milk container, when the latter is carried by the present cart with the platform in a raised and locked position to prevent downward sliding movement of the container on the brace members and handle.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A hand truck comprising an axle having wheels at the ends thereof, a tubular handle having one end fixed to the central portion of said axle, said handle having an arcuate free end portion, a pair of substantially triangular supports having inner corners and flat outer sides, sleeves fixed to the inner corners of said supports and journaled on said axle for rotation, a pair of arcuate tubular brace members having upper and lower end portions, the upper end portion of each of said brace members being fixed to said handle adjacent the arcuate free end portion thereof, means securing the lower end portion of each of said brace members to a corresponding outer side of each of said supports, an arcuate bearing member fixed at its ends to the lower end portions of said brace members, means securing the central portion of said bearing member to the central portion of said axle and the fixed end of said handle, a substantially rectangular platform, further sleeves fixed to one longitudinal edge of said platform and journaled on said axle for rotation, said platform being supported by said bearing member in an operative position, a transverse, concaved recess provided in said platform for receiving said handle adjacent the fixed end thereof, a collar slidably received on said handle, and an arcuate extension projecting from one end of said collar embracing a portion of said platform to retain the latter in an inoperative position.

ALBERT A. DAVIS.

REFERENCES CITED

The following references are of record in the file of this patent:

UNITED STATES PATENTS

| Number | Name | Date |
|---|---|---|
| 499,212 | Coffield | June 13, 1893 |
| 618,629 | Watts et al. | Jan. 31, 1899 |
| 2,014,057 | Rogers | Sept. 10, 1935 |
| 2,472,670 | McFarland | June 7, 1949 |

FOREIGN PATENTS

| Number | Country | Date |
|---|---|---|
| 497,328 | Great Britain | Dec. 14, 1938 |